United States Patent [19]

Okabayashi et al.

[11] Patent Number: 4,627,809
[45] Date of Patent: Dec. 9, 1986

[54] METAL MOLD AND STAMPER FOR INJECTION MOLDING OF A PLASTIC DISC FOR A HIGH-DENSITY INFORMATION RECORDING CARRIER

[75] Inventors: Norio Okabayashi, Himeji; Yoshio Onizawa, Hyogo, both of Japan

[73] Assignee: Daicel Chemical Industries, Ltd., Osaka, Japan

[21] Appl. No.: 642,905

[22] Filed: Aug. 21, 1984

[30] Foreign Application Priority Data

Sep. 22, 1983 [JP]  Japan .............................. 58-174173

[51] Int. Cl.⁴ .............................................. B29C 45/37
[52] U.S. Cl. .................................... 425/555; 264/106; 425/810
[58] Field of Search ...................... 425/542, 555, 810; 264/1.3, 106, 107, 272.13, 342 R; 204/5

[56]  References Cited
U.S. PATENT DOCUMENTS 1,665,759  4/1928  Vasselli .............................. 264/107
2,616,125  11/1952  Colombo ............................. 264/107
4,085,178  4/1978  McNeely et al. .................... 264/106
4,185,955  1/1980  Holmes et al. ...................... 425/810

FOREIGN PATENT DOCUMENTS 2701562  7/1978  Fed. Rep. of Germany ...... 264/107

Primary Examiner—Jay H. Woo
Assistant Examiner—J. Fortenberry
Attorney, Agent, or Firm—Armstrong, Nikaido, Marmelstein & Kubovcik

[57]  ABSTRACT

A metal mold to be used for injection-molding of a flat plastic disc. The flat, annular mold cavity has a substantially continuously increasing axial thickness away from the injection gate. The gate can be in the center or on the outer periphery of the mold. A split mold type is disclosed wherein at least one of the inner opposed surfaces tapers away from an imaginary flat center plane. Alternatively, a stamper having a tapering thickness can be used in a mold having parallel opposed inner surfaces.

9 Claims, 6 Drawing Figures

METAL MOLD AND STAMPER FOR INJECTION MOLDING OF A PLASTIC DISC FOR A HIGH-DENSITY INFORMATION RECORDING CARRIER

BACKGROUND OF THE INVENTION

The present invention relates to an improvement in a molding method of a disc, particularly, a plastic disc for a high-density information recording carrier such as a video disc, an optical disc and the like, and more particularly an improved metal mold and a stamper to be used for an injection molding of the plastic disc.

In general, a plastic disc to be used for a video disc or an optical disc is very thin and flat such that a thickness of the plastic disc is about 1.2-1.5 mm. The diameter is about 300 mm maximum. Acrylic resin (PMMA) and polycarbonate resin (PC) having low fluidity are used as materials for the plastic disc. Therefore, it is difficult to mold a completely satisfactory plastic disc even at present. In various performances required by such kind of disc, stability in size and shape of the molded product is important. For example, a thickness of the disc must be $1.2 \pm 0.1$ mm, and there must not be any curve and twist in the molded product. Even when an ultra precision injection molding machine which is being now developed is used, it is difficult to mold such a super precise plastic disc. A primary reason of such difficulty is that when molten resin is uniformly injected and filled into a mold cavity having a very small lateral width and a large diameter, a difference in solidification speed of the resin and in filling pressure is created between a position near a gate and a position away from the gate. This results in ununiformity of a thickness of the molded product, and further occurrence of curve and twist of the product due to residual distortion.

Although PMMA and PC having good flowability and low molecular weight may be used as resin materials, so as to obviate the above-mentioned defects, it is necessary to use PMMA and PC having low fluidity and high molecular weight to enhance durability, heat-resistance and dimensional stability of the disc. However, in the case that such materials having high molecular weight are used, transferability or replicating property from the stamper as well as stability in size and shape deteriorate.

A method of producing a disc for a high-density information recording carrier by injection molding as directed by the present invention is known in the art, e.g. Japanese Patent Laid-Open Patent Appln. No. 56-139940 and Japanese Patent Laid-Open Patent Appln. No. 57-203517. In these injection molding methods, size of a molding cavity of a metal mold is set in such that a shrinkage rate of a desired molded product is included. However, in practice, the thickness of the plastic disc molded by using this metal mold does not become identical with the size of the molding cavity, but a central portion of the disc becomes relatively thicker as compared with an outer peripheral portion thereof, and further dimensional stability of the molded product is deteriorated because of the shrinkage.

OBJECTS AND SUMMARY OF THE INVENTION

Accordingly, it is an object of the present invention to provide a method of injection-molding a plastic disc for a high-density information recording carrier having a uniform thickness distribution in a radical direction and a superior shape stability of the finished molded product.

To attain the object, according to the present invention, a radial thickness of the molding cavity is continuously increased with radially leaving a gate through which molten resin is injected into the molding cavity. In other words, the molding cavity is divergingly tapered in its radial direction.

The direction of injection of molten resin may be outward or inward in the radial direction of the molding cavity. Generally, the molten resin is injected into a center of a flat molding cavity, and is diverged from the center in a radially outward direction. This type of injection molding machine for producing a plastic disc for a high-density information recording carrier is disclosed in Japanese Patent Laid-Open Patent Appln. No. 56-139940 as previously mentioned and Japanese Patent Application No. 58-115900 as filed by the present applicant. Inversely, another type of injection molding machine for injection molten resin from an outer periphery of the mold cavity in a radially inward direction may be applicable to the present invention. This type of machine is disclosed in e.g. Japanese Patent Application No. 58-126183 as filed by the present applicant.

The plastic disc for a high-density information recording carrier in the present invention is generally molded by using a stamper having a submicron order unevenness surface or pits for signals or tracks. Change in an axial thickness distribution of the molding cavity according to the present invention may be attained by changing a radial thickness distribution of the stamper. In other words, the present invention may be achieved by the following systems.

(1) Opposite surfaces in the axial direction defining the molding cavity are parallel to an imaginary central plane of the molding cavity, but the thickness of the stamper is tapered.

(2) The thickness of the stamper is uniform, but the opposite surfaces in the axial direction of the molding cavity are inclined or tapered.

(3) The systems (1) and (2) are combined.

In the case that the radius (L) of the plastic disc to be molded is 150 mm and the thickness is 1.2 mm, the difference (d) between a maximum value ($D_1$) and a minimum value ($D_2$) of the axial thickness of the molding cavity according to the present invention may be within $100\mu$, and preferably in the range of $d = 10-50\mu$. Generally, the value of (d) is decreased with decrease in the radius of the plastic disc.

DETAILED DESCRIPTION OF THE INVENTION

The present invention will be described below in connection with the attached drawings.

Figure 1:
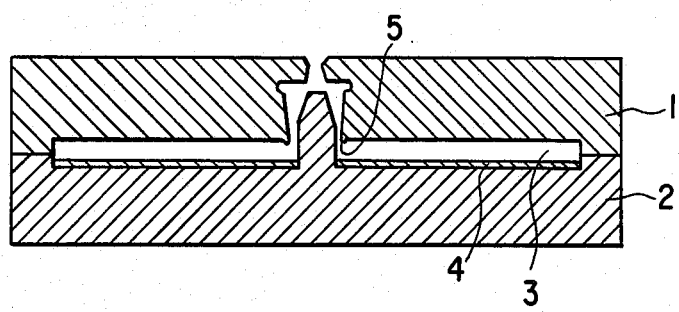
FIG. 1 is a schematic sectional view of the metal mold in the prior art method.

First, a metal mold for molding a plastic disc for a high-density information recording carrier in the prior art will be outlined by using FIG. 1. Molten resin such as PMMA, PC and PVC is injected from an injection molding machine (not shown) through a central gate 5 into a mold cavity 3 defined between split molds 1 and 2. Generally, a stamper 4 having signal information consisting of pits on the surface thereof is fixed on a surface of the molding cavity 3 by fittings (not shown). Size of the molding cavity 3 is remarkably thin such that for example an axial thickness is 1.2 mm and a diameter is 300 mm, and therefor L (radius)/D (thickness)=125. This size is set to substantially the same value as that of a disc of a final molded product.

However, the size of the plastic disc molded by the molding cavity according to the prior art method does not practically become identical with the size of the mold cavity. In other words, the thickness at a portion near the central gate 5 becomes relatively thicker, and the thickness at an outer peripheral portion away from the central gate 5 becomes relatively thinner. This is due to the fact that the molding cavity is very flat and thin such that the value of L/D is 125. Accordingly, a difference in solidification speed of the molten resin as injected is created between a position at the central portion of the mold cavity and a position at the outer peripheral portion thereof. This is because solidification has already started at the portion away from the gate near the end of injection process, and the molten resin supplied at the end of the injection process is permitted to be filled only at the portion near the gate. To eliminate such a disadvantage, there is provided a temperature distribution in the radial direction of the metal mold. However, provision of only a temperature gradient is not sufficient to solve the problem as mentioned above.

Figure 2:
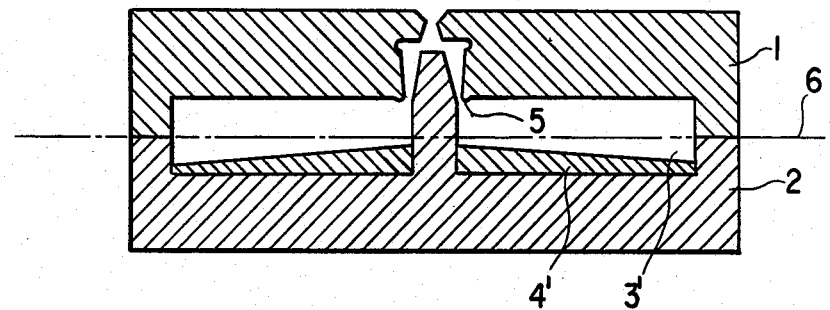
FIG. 2 is a schematic sectional view of an embodiment according to the present invention, wherein corresponding members as in FIG. 1 are shown by the same reference numerals as FIG. 1.
Figure 3:
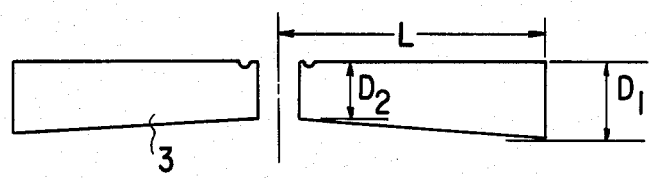
FIG. 3 is an explanatory illustration showing the shape of the molding cavity in FIG. 2.

Accordingly, the present invention is intended to eliminate the defects in the prior art method by increasing an axial thickness of the molding cavity at a distance away from the gate. A preferred embodiment of the present invention will be described below in connection with FIG. 2 to 4. FIGS. 2 and 3 are schematic illustrations showing a principle of the present invention, wherein relative sizes of each member is exaggerated for purposes of clarification of effect of the present invention, and unessential members are not shown in the drawings. Detailed metal mold structure for the plastic disc for a high-density information recording carrier may be found in Japanese Patent Laid-Open Patent Appln. No. 56-139940 and Japanese Patent Application No. 58-115900 as previously mentioned.

Referring to FIG. 2 which shows a schematic view of the metal mold of the preferred embodiment according to the present invention, the mold cavity defined by the split molds 1 and 2 is identical with that of the prior art one, except that an axial thickness of a stamper 4' is decreased away from the gate 5 by tapering the stamper 4' in such a manner as to diverge from an imaginary central plane 6 of the molding cavity. As shown in FIG. 3, size of the molding cavity defined by the metal mold is such that a central portion of the cavity is relatively small in thickness, while an outer peripheral portion is relatively large in thickness. The difference $(d=D_1-D_2)$ between the axial thickness $D_2$ (minimum value) of the molding cavity near the central gate 5 and the axial thickness $D_1$ (maximum value) near the outer peripheral portion may be $d<100\mu$, and perferably $(d)=10-50\mu$ in case of e.g. $L/D_1=125$, although the difference is variable with injection molding conditions. In conclusion, the radial thickness distribution of a final molded product may be selected so as to be rendered uniform under a given injection molding conditions.

The stamper 4' with the tapered surface as is above described may be produced by a method disclosed in copending Japanese Patent Application No. 58-121690 filed July 6, 1983 (corresponding U.S. application Ser. No. 628,369 filed July 6, 1984 now U.S. Pat. No. 4,539,079) by the present applicant.

Although the stamper is provided on the surface of the split mold 2 defining the molding cavity, it is possible to provide another stamper on the split mold 1.

Figure 4:
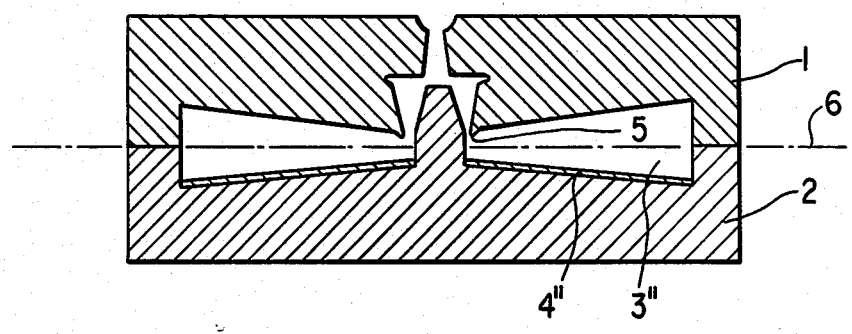
FIG. 4 is a schematic view of another embodiment according to the present invention.

Referring next to FIG. 4 which shows another embodiment of the present invention, the difference of thickness in the radial direction of a molding cavity 3" is provided by the surfaces of both the split molds defining molding cavity. In other words, a thickness of the stamper 4" is uniform, but the surfaces of both the split molds 1 and 2 defining the molding cavity are tapered in such a manner as to diverge from an imaginary central plane 6 of the molding cavity away from the central gate 5. Although the tapered surfaces are provided on both the split molds 1 and 2 in FIG. 3, it is possible to provide the tapered surface on either of the split molds 1 or 2, and further provide another stamper on the split mold.

Although the above-described embodiments are applied to a central supply type of injection molding where the injection gate 5 for injecting molten resin is formed at the central portion of the molding cavity, it is possible to apply the present invention to a circumferential supply type where an injection gate is provided at an outer circumferential portion of the molding cavity. This type of injection molding metal mold is disclosed in Japanese Patent Application No. 58-126183 filed by the present applicant. In case of this circumferential supply type, direction of tapering is naturally reversed.

Moreover, although the stamper is used in the embodiments in FIGS. 2 and 4, it is possible to apply the present invention to the case that a flat disc is molded without a stamper by using only the surfaces of the split molds 1 and 2 defining the molding cavity. In this case, the flat disc may be molded by the molds 1 and 2 with the stamper 4" omitted in FIG. 4.

One example according to the present invention will be described in the following manner.

EXAMPLE

Figure 5:
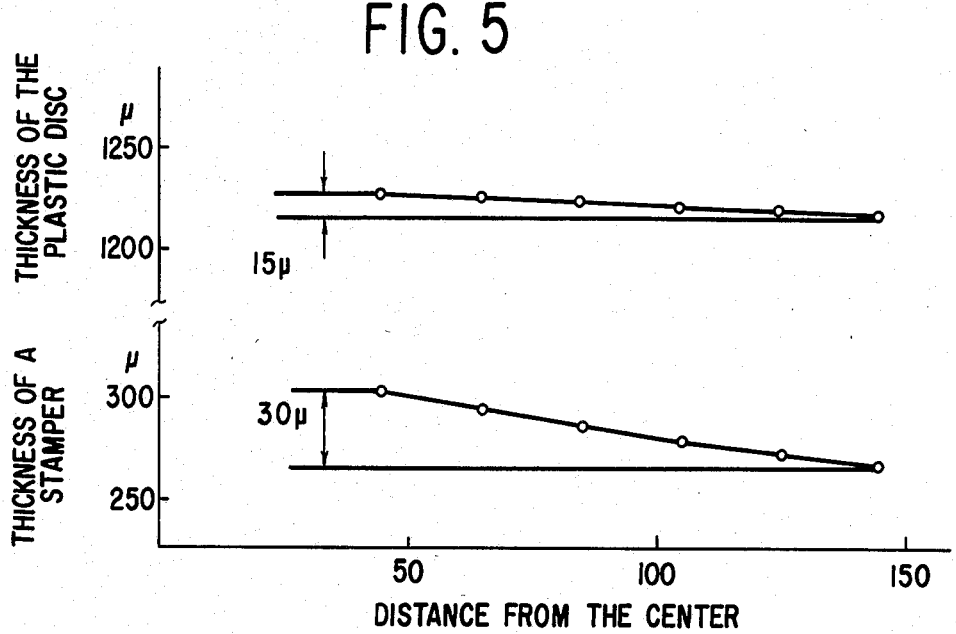
FIG. 5 is a graph showing a relation of a distance (mm) from the center with each radial thickness of the stamper and the molded product according to an example of the present invention.

A stamper having a radial thickness distribution as shown by the lower graph in FIG. 5 was produced by a method disclosed in Japanese Patent Application No. 58-121690 filed July 6, 1983 by the present applicant entitled "Method and Apparatus for Electroforming a Stamper for producing a High-Density Information Recording Carrier (Corresponding U.S. application Ser. No. 628,369 filed July 6, 1984). Difference in thickness between near the center of the stamper and near the circumference thereof was set to $30\mu$.

After the stamper was mounted to a metal mold, methylmethacrylate resin (MFR: 2 g/10 min) was supplied from the center of the metal mold to carry out injection molding by using an injection molding machine (DM-200 manufactured by Meiki Seisakusyo K.K.). Temperature of an injection cylinder was 300° C., and temperature of the metal mold was 55° C.

As shown by the upper graph in FIG. 5, the radial thickness distribution of the plastic disc as obtained was such that the difference in thickness between near the central portion and near the outer circumferential portion was only 15μ. Such degree of difference in thickness is practically permissible for producing a disc for a high-density information recording carrier. Furthermore, shrink at the outer circumferential portion of the disc as produced by the stamper was remarkably small as compared with a comparative example.

COMPARATIVE EXAMPLE

Figure 6:
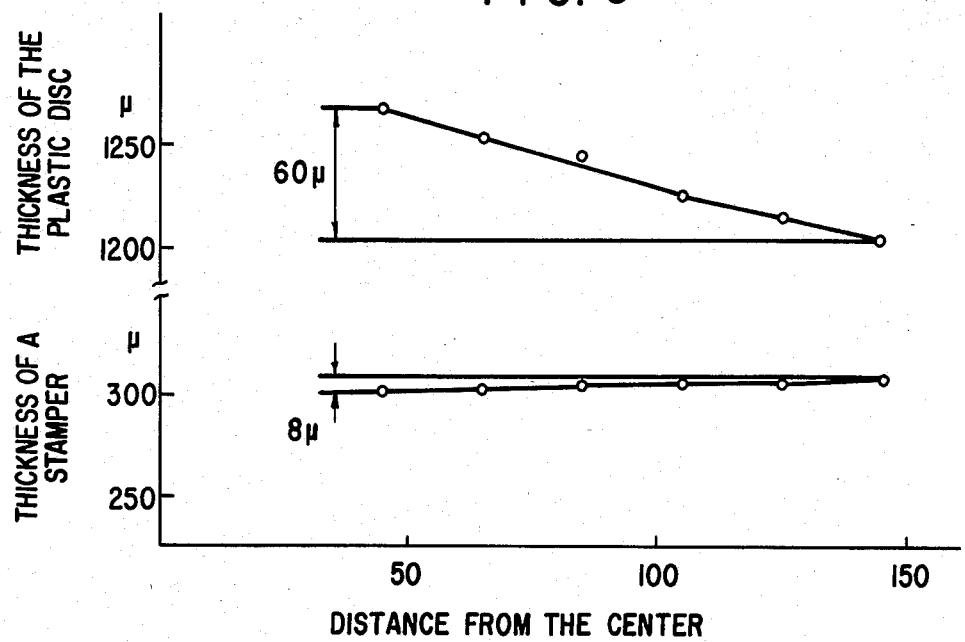
FIG. 6 is a similar graph as with FIG. 5, showing radial thickness distributions of the stamper and the molded product according to the prior art method.

A stamper having a radial thickness distribution as shown by the lower graph in FIG. 6 was produced by the same method as of the above-described Example of the present invention. Difference in thickness between near the central portion of this stamper is nearly the same as a stamper with uniform thickness as conventially used.

The radial thickness distribution of the disc as molded by this stamper under the same molding conditions as those in the above-described Example of the present invention was not uniform such that the difference in thickness between near the central portion and near the outer circumferential portion was 60μ, as shown by the upper graph in FIG. 6. Further, shrink at the outer circumferential portion of the disc was very much larger than the present invention.

As should be apparent from the above description, a molded product with uniform thickness may be obtained by providing for a stamper with a radial thickness distribution decreased away from an injection gate.

It should be understood that various variations may be made without limiting the invention to the specific embodiments as above described.

What is claimed is:

1. In a metal mold to be used for injection-molding a flat plastic disc having uniform thickness for a high-density information recording carrier by injecting molten resin into a flat and annular mold cavity, the improvement characterized in that an axial thickness of the flat and annular injection mold cavity is substantially continuously increased away from a gate at the center of the molding cavity outwardly from the gate to the mold cavity perimeter for injecting the molten resin into the center of the mold and forming a flat resin disc having uniform thickness when molten resin is injection molded in said cavity.

2. The metal mold as defined in claim 1, wherein there is provided a flash gate in the vicinity of the outer periphery in the radial direction of the mold cavity.

3. The metal mold as defined in any one of the claims 1 or 2, wherein said molding cavity is defined by a first split mold and a second split mold having axially opposed surfaces.

4. The metal mold as defined in claim 3, wherein the axial thickness of said molding cavity is varied by tapering at least one of the axially opposed surfaces of said first and second split molds relative to an imaginary central plane of said flat annular molding cavity.

5. The metal mold as defined in any one of claims 1 or 2, further comprising a stamper disposed on at least one of the axially opposed surfaces formed by first and second split molds forming said molding cavity.

6. The metal mold as defined in claim 5, wherein said inner surfaces of said first and second split molds in said molding cavity are parallel to an imaginary central plane, and a thickness of said stamper is continuously decreased radially away from a point near the injection gate of said molding cavity.

7. The metal mold as defined in claim 5, wherein a thickness of said stamper is substantially uniform from a point near a central portion to a radially outer peripheral portion, and a distance between at least one of said inner surfaces of said first and second split mold cavity and an imaginary central plane of said flat molding cavity is continuously increased from a point near the radially central portion to the radially outer peripheral portion.

8. In a stamper to be disposed in a metal mold for injection-molding a flat plastic disc having uniform thickness for a high-density information recording carrier by injecting molten resin into a flat annular injection molding cavity, the improvement characterized in that a thickness of said stamper is continuously decreased radially outwardly away from an injection gate at the center of said mold cavity to the mold cavity perimeter for the molten resin for injecting molding flat disc having uniform thickness.

9. The stamper as defined in claim 8, wherein said stamper has a submicron order unevenness for signals on its surface opposed to said molding cavity.

* * * * *